United States Patent [19]

Maeba

[11] Patent Number: 4,819,145

[45] Date of Patent: Apr. 4, 1989

[54] DIRECT CURRENT POWER UNIT

[75] Inventor: Yukio Maeba, Kyoto, Japan

[73] Assignee: Murata Manufacturing Co., Ltd., Japan

[21] Appl. No.: 222,204

[22] Filed: Jul. 21, 1988

[30] Foreign Application Priority Data

Jul. 22, 1987 [JP] Japan .......................... 62-112382[U]

[51] Int. Cl.[4] .............................................. H02M 7/02

[52] U.S. Cl. ....................................... 363/63; 363/126

[58] Field of Search .................. 363/63, 89, 123, 125, 363/126

[56] References Cited

U.S. PATENT DOCUMENTS

| | | | |
|---|---|---|---|
| 3,343,064 | 9/1967 | Bright | 363/126 |
| 3,500,169 | 3/1970 | Ibsen | 363/126 |
| 4,202,032 | 5/1980 | Morez | 363/126 |
| 4,527,229 | 7/1985 | Imamura et al. | 363/126 |
| 4,626,697 | 12/1986 | Nelson | 363/126 |

*Primary Examiner*—Peter S. Wong
*Attorney, Agent, or Firm*—Ostrolenk, Faber, Gerb & Soffen

[57] ABSTRACT

In a direct current power unit, a-c (alternating current) voltages outputted to secondary windings (28, 47) of transformers (26, 45) are rectified by rectifier diodes (**30*a*, 30*b*), respectively, to output a positive d-c (direct current) voltage and a negative d-c voltage. The level of the positive d-c voltage is regulated by a first voltage regulator crcuit (34*a*) while the level of the negative d-c voltage is regulated by a second voltage regulator circuit (34*b*). A first switch (36*a*) and a first variable resistance (38*a*) as well as a second variable resistance (38*b*) and a second switch (36*b*) are connected in series to outputs of the first voltage regulator circuit and the second voltage regulator circuit, respectively. When the first switch is closed and the second switch is opened, the positive d-c voltage is outputted to an output terminal (44) from the first variable resistance through a backflow preventing diode (42*a*). On the other hand, when the first switch is opened and the second switch is closed, the negative d-c voltage is outputted to the output terminal from the second variable resistance through a backflow preventing diode (42*b***).

7 Claims, 2 Drawing Sheets

DIRECT CURRENT POWER UNIT

BACKGROUND OF THE INVENTION

1. Field of the Invention

The present invention relates generally to direct current power units, and more particularly, to a direct current power unit which is employed for supplying a bias voltage for development and can switch the polarity of an output voltage into negative or positive polarity, in an electrostatic recording apparatus such as an electrostatic copying apparatus and an electrostatic printer.

2. Description of the Prior Art

FIG. 1 is a schematic diagram showing an example of a main portion of an electrostatic recording apparatus, and FIG. 2 is a diagram showing the principle of a direct current power unit for supplying a bias voltage for development.

As shown in FIG. 1, in the electrostatic recording apparatus, positive charges are applied to the surface of a photoreceptor drum 2 by a charger 4 and then, exposure light 6 reflected from an image is irradiated on the surface of the photoreceptor drum 2 so that a latent electrostatic image is formed. A toner is then adhered to the surface of the photoreceptor drum 2 by a brush 8 to which a bias voltage for development is applied. Since such an electrostatic recording apparatus has been conventionally known, the description of the subsequent processes is omitted.

In the above described electrostatic recording apparatus, if and when black and white of an image to be recorded are inverted to each other, the polarity of the bias voltage for development applied to the brush 8 must be inverted. As a direct current power circuit for supplying such a bias voltage for development, a circuit as shown in FIG. 2 is employed.

In FIG. 2, when it is desired to obtain a positive bias voltage for development, a negative power supply **10*b* is turned off and one end of a resistance 12*b* is grounded, so that a positive output voltage $+V_0$ is obtained at an output terminal 14 from a positive power supply 10*a* through a resistance 12*a*. Contrary to this, when it is desired to obtain a negative bias voltage for development, the positive power supply 10*a* is turned off and one end of the resistance 12*a* is grounded, so that a negative output voltage $-V_0$ is obtained at the output terminal 14 from the negative power supply 10*b* through the resistance 12*b*. The positive or negative output voltage $V_0$ outputted to the output terminal 14 is supplied to the above described brush 8** as a bias voltage for development.

FIG. 3 is an electric circuit diagram of a direct current power circuit structured using a transformer.

In FIG. 3, one end of a secondary winding 18 of a transformer 16 is grounded. The secondary winding 18 has another end connected to the anode of a rectifier diode **20*a* as well as the cathode of a rectifier diode 20*b*. The cathode of the rectifier diode 20*a* is connected to one end of a smoothing capacitor 17*a* as well as a voltage regulator circuit 22*a*. The anode of the rectifier diode 20*b* is connected to one end of a smoothing capacitor 17*b* as well as a voltage regulator circuit 22*b*. The smoothing capacitors 17*a* and 17*b* have respective other ends connected to ground. The voltage regulator circuits 22*a* and 22*b*** are used for making a d-c (direct current) voltage a constant voltage.

Output voltages from the voltage regulator circuits **22*a* and 22*b* are outputted to an output terminal 14 through resistances 12*a* and 12*b*, respectively. The resistances 12*a* and 12*b* are used for turning off either one of the voltage regulator circuits 22*a* and 22*b* as well as dividing the output voltage of the other voltage regulator circuit when the output terminal is grounded. More specifically, when the voltage regulator circuit 22*b* is turned off and the output terminal side thereof is grounded, a positive voltage outputted from the voltage regulator circuit 22*a* is divided by the resistances 12*a* and 12*b*, so that the positive output voltage $+V_0$ is outputted to the output terminal 14. Contrary to this, when the voltage regulator circuit 22*a* is turned off and the output terminal side thereof is grounded, a negative voltage outputted from the voltage regulator circuit 22*b* is divided by the resistances 12*b* and 12*a*, so that the negative output voltage $-V_0$ is obtained at the output terminal 14**.

However, in the direct current power circuit as shown in FIG. 3, the output voltage of the voltage regulator circuit **22*a* or 22*b* is divided into approximately halves by the resistances 12*a* and 12*b*, to obtain the positive or negative output voltage $V_0$, so that a high voltage which is two or more times a desired output voltage $V_0$ is required as the output voltages of the voltage regulator circuits 22*a* and 22*b*. Therefore, large capacity circuit parts are required as circuit parts such as the transformer 16**, so that each of the circuit parts is increased in size. Accordingly, the entire power unit is increased in size, so that the cost thereof becomes higher.

Additionally, in the power circuit shown in FIG. 3, either one of the voltage regulator circuits **22*a* and 22*b*** must be turned off to ground the output terminal end thereof in order to obtain either one of the output voltages, so that circuit structure therefor becomes complicated.

SUMMARY OF THE INVENTION

Therefore, an object of the present invention is to provide a direct current power unit in which a negative or positive output voltage can be obtained using relatively small-sized circuit parts and with relatively simple structure.

Another object of the present invention is to provide a direct current power unit in which a negative or positive d-c voltage can be obtained by only switching means.

Briefly stated, according to the present invention, a positive d-c voltage and a negative d-c voltage are outputted by a rectifier circuit connected to a secondary winding of a transformer. The positive d-c voltage level is regulated by a first voltage regulator circuit while the negative d-c voltage level is regulated by a second voltage regulator circuit. Between respective outputs of the first voltage regulator circuit and the second voltage regulator circuit, a first switch and a first resistance type potential divider circuit are connected in series such that the first switch is located on the output side of the first voltage regulator circuit and the first resistance type potential divider circuit is located on the output side of the second voltage regulator circuit, while a second resistance type potential divider circuit and a second switch are connected in series such that the second resistance type potential divider circuit is located on the output side of the first voltage regulator circuit and the second switch is located on the output side of the second voltage regulator circuit, so that a positive d-c voltage outputted from the first resistance type potential divider circuit and a negative d-c voltage outputted from the second resistance type potential divider circuit are outputted to an output terminal.

Thus, according to the present invention, the positive d-c voltage is outputted from the output terminal if the first switch is closed and the second switch is opened while a negative d-c voltage is outputted from the output terminal if the first switch is opened and the second switch is closed.

In another preferred embodiment of the present invention, the rectifier circuit is structured by a voltage doubler rectifier circuit or a rectifier circuit with a center tap.

Additionally, in still another embodiment of the present invention, each of the first and second voltage regulator circuits is structured by a resistance and a zener diode.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. a schematic diagram showing an example of a main portion of an electrostatic recording apparatus.

DESCRIPTION OF THE PREFERRED EMBODIMENTS

Figure 1:
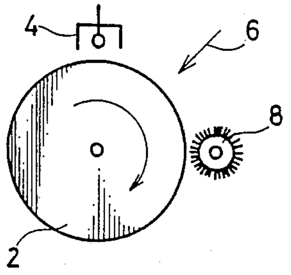
FIG. 1 PRIOR ART
Figure 2:
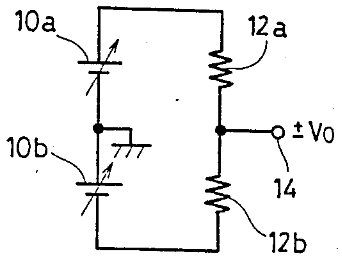
FIG. 2 PRIOR ART
FIG. 2 is a diagram showing the principle of a conventional direct current power circuit.
Figure 3:
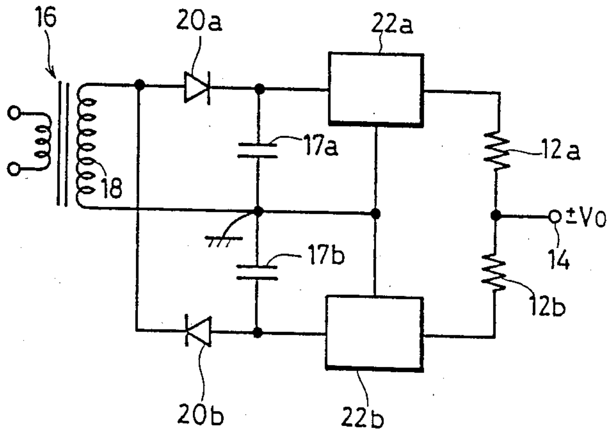
FIG. 3 PRIOR ART
FIG. 3 is an electric circuit diagram showing an example of the conventional direct current power circuit.
Figure 4:
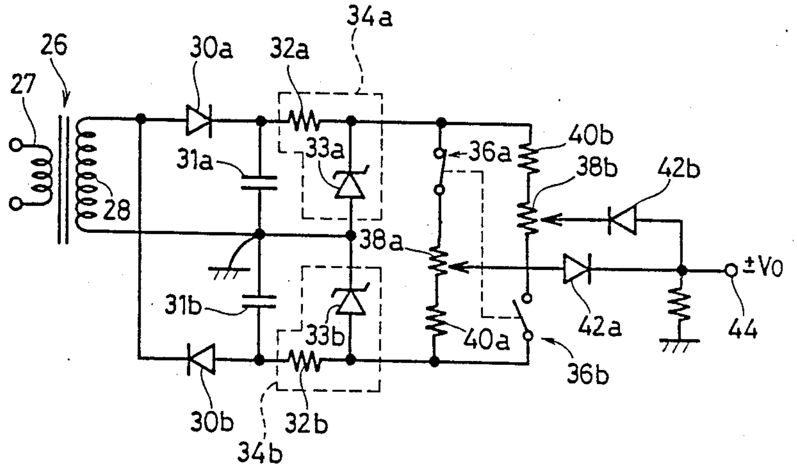
FIG. 4 is an electric circuit diagram according to an embodiment of the present invention.

FIG. 4 is an electric circuit diagram according to an embodiment of the present invention.

Referring now to FIG. 4, the structure will be described. A transformer 26 includes a primary winding 27 and a secondary winding 28. The secondary winding 28 has one end connected to ground and another end connected to the anode of a first rectifier diode 30*a* as well as the cathode of a second rectifier diode 30*b*. A first smoothing capacitor 31*a* is connected between the cathode of the first rectifier diode 30*a* and the ground. A second smoothing capacitor 31*b* is connected between the anode of the second rectifier diode 30*b* and the ground. Thus, in the present embodiment, the rectifier circuit constitutes a voltage doubler rectifier circuit.

Furthermore, one end of a resistance 32*a* is connected to the cathode of the first rectifier diode 30*a*. A zener diode 33*a* is connected between the other end of the resistance 32*a* and the ground. The resistance 32*a* and the zener diode 33*a* constitute a first voltage regulator circuit 34*a*. One end of a resistance 32*b* is connected to the anode of the second rectifier diode 30*b*. A zener diode 33*b* is connected between the other end of the resistance 32*b* and the ground. The resistance 32*b* and the zener diode 33*b* constitute a second voltage regulator circuit 34*b*.

A first switch 36*a*, a variable resistance 38*a* and a resistance 40*a* are connected in series on the output sides of the first voltage regulator circuit 34*a* and the second voltage regulator circuit 34*b* such that the first switch 36*a* is located on the output side of the first voltage regulator circuit 34*a* and a series circuit of the first variable resistance 38*a* serving as resistance type potential divider means and the resistance 40*a* is located on the output side of the second voltage regulator circuit 34*b*. The first switch 36*a*, the variable resistance 38*a* and the resistance 40*a* constitute first voltage outputting means.

Additionally, a resistance 40*b*, a second variable resistance 38*b* and a second switch 36*b* are connected in series between the output sides of the first voltage regulator circuit 34*a* and the second voltage regulator circuit 34*b* such that the second switch 36*b* is located on the output side of the second voltage regulator circuit 34*b* and a series circuit of the resistance 40*b* and the second variable resistance 38*b* serving as second resistance type potential divider means is located on the output side of the first voltage regulator circuit 34*a*. The anode of a backflow preventing diode 42*a* is connected to a movable terminal of the first variable resistance 38*a* and the cathode thereof is connected to an output terminal 44. In the same manner, the cathode of a backflow preventing diode 42*b* is connected to a movable terminal of the second variable resistance 38*b* and the anode thereof is connected to the output terminal 44.

Meanwhile, the first switch 36*a* and the second switch 36*b* are structured by a manual switch, a relay contact, a semiconductor switch or the like. More preferably, the first switch 36*a* and the second switch 36*b* are adapted such that the second switch 36*b* is opened when the first switch 36*a* is closed while the second switch 36*b* is closed when the first switch 36*a* is opened.

Referring now to FIG. 4, the operation according to an embodiment of the present invention will be described. A positive d-c voltage which is made a constant voltage by the zener diode 33*a* is outputted on the output side of the first voltage regulator circuit 34*a*, and a negative d-c voltage which is made a constant voltage by the zener diode 33*b* is outputted on the output side of the second voltage regulator circuit 34*b*. The levels of the d-c voltages can be freely set by changing zener voltages of the zener diodes 33*a* and 33*b*.

When the first switch 36*a* is closed and the second switch 36*b* is opened, respective voltages outputted from the first voltage regulator circuit 34*a* and the second voltage regulator 34*b* are divided by the variable resistance 38*a* and the resistance 40*a*, so that a positive voltage whose level is made variable is obtained at the movable terminal of the variable resistance 38*a*. This positive voltage is outputted as a positive output voltage $V_0$ to the output terminal 44 through the backflow preventing diode 32*a*. In this case, since the backflow preventing diode 42*b* is connected in the opposite direction to the output voltage of the first voltage regulator circuit 34*a*, no current flows in the second variable resistance 38*b*.

Meanwhile, a voltage of a node of the variable resistance 38*a* and the resistance 40*a* may be set to 0 V. However, if the voltage is set to be almost 0 V but slightly negative, the output voltage $V_0$ can be surely changed to 0 V by regulating the variable resistance 38*a*.

On the other hand, when the first switch 36*a* is opened and the second switch 36*b* is closed, the respective output voltages of the first voltage regulator circuit 34*a* and the second voltage regulator circuit 34*b* are divided by the resistance 40*b* and the variable resistance 38*b*, so that a negative voltage whose level is made variable can be obtained at the movable terminal of the variable resistance 38*b*. This negative voltage is outputted as an output voltage $-V_0$ to the output terminal 44 through the backflow preventing diode 42*b*. In this case, since the backflow preventing diode 42*a* is connected in the opposite direction to the output voltage of the second voltage regulator circuit 34*b*, no current flows in the variable resistance 38*a*. Also in this case, a voltage of a node of the resistance 40*b* and the variable resistance 38*b* may be set to 0 V. However, if the voltage is set to be almost 0 V but slightly positive, the output voltage $V_0$ can be surely changed to 0 V by regulating the variable resistance 38*b*.

As described above, according to the present embodiment, the polarity of negative or positive of the output voltage $V_0$ can be switched by switching the switches 36*a* and 36*b*. In addition, the levels of the voltages can be freely changed from a voltage almost equal to the output voltage of the voltage regulator circuit 34*a* or 34*b* from 0 V by the variable resistances 38*a* and 38*b*, respectively. Furthermore, since the rectifier circuit is structured by the voltage doubler rectifier circuit, the secondary winding 28 of the transformer 26 requires the number of turns sufficient to produce an a-c (alternating current) voltage for obtaining the output voltage $V_0$, so that the transformer 26 can be miniaturized.

Figure 5:
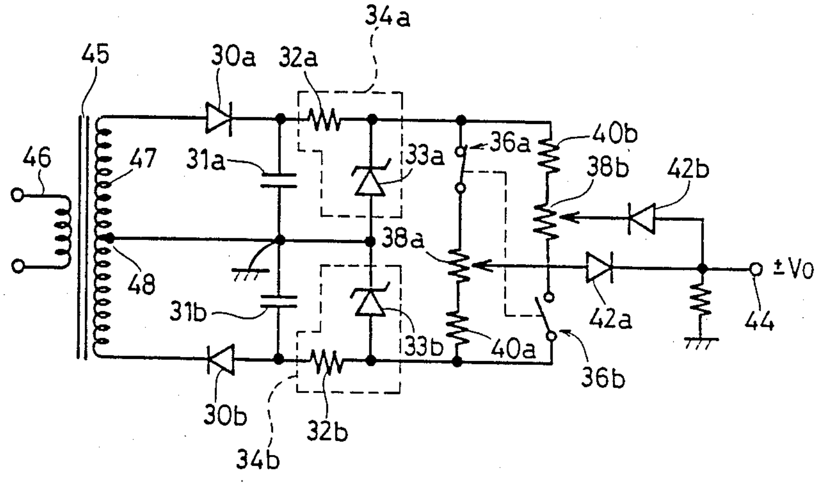
FIG. 5 is an electric circuit diagram showing another embodiment of the present invention.

FIG. 5 is an electric circuit diagram showing another embodiment of the present invention.

The embodiment shown in FIG. 5 is the same as the above described embodiment shown in FIG. 4 except that a transformer 45 includes a primary winding 46 and a secondary winding 47 having a center tap 48, in which the secondary winding 47 has one end connected to the anode of a first rectifier diode 30*a* and another end connected to the cathode of a second rectifier diode 30*b*. Bridge type rectifier diodes may be connected in place of the first rectifier diode 30*a* and the second rectifier diode 30*b*.

As described in the foregoing, according to the present invention, the polarity of the output voltage can be switched only by switching first and second switching means.

Although the present invention has been described and illustrated in detail, it is clearly understood that the same is by way of illustration and example only and is not to be taken by way of limitation, the scope of the present invention being limited only by the terms of the appended claims.

What is claimed is:

1. A direct current power unit capable of switching the polarity of an output voltage into negative or positive polarity, comprising:

transformers each comprising a primary winding and a secondary winding for transforming an alternating current voltage inputted to said primary winding to output the same to said secondary winding, rectifier means each connected to the secondary winding of said transformer for outputting a positive direct current voltage and a negative direct current voltage, first voltage regulator means for regulating the positive direct current voltage level outputted from said rectifier means, second voltage regulator means for regulating the negative direct current voltage level outputted from said rectifier means, first voltage output switching means located on the output side of said first voltage regulator means and first resistance type potential divider means located on the output side of said second voltage regulator means, in which said first switching means and said first resistance type potential divider means are connected in series between the outputs of said first voltage regulator means and said second voltage regulator means, switching means located on the output side of said second voltage regulator means and second resistance type potential divider means located on the output side of said first voltage regulator means, in which said second switching means and said second resistance type potential divider means are connected in series between the outputs of said second voltage regulator means and said first voltage regulator means, and an output terminal to which the positive direct current voltage outputted from said first resistance type potential divider means and the negative direct current voltage outputted from said second resistance type potential divider means are applied.

2. The direct current power unit according to claim 1, wherein one end of the secondary winding of said transformer is grounded, said rectifier means comprising a first rectifier diode comprising an anode and a cathode, in which the anode is connected to the one end of the secondary winding of said transformer and the positive direct current voltage is outputted from the cathode, a first smoothing capacitor connected between the cathode of said first rectifier diode and the ground, a second rectifier diode comprising an anode and a cathode, in which the cathode is connected to the other end of the secondary winding of said transformer and the negative direct current voltage is outputted from the anode, and a second smoothing capacitor connected between the anode of said second rectifier diode and the ground.

3. The direct current power unit according to claim 1, wherein said transformer comprises a center tap provided at a middle point of the secondary winding and grounded, said rectifier means comprising a first rectifier diode comprising an anode and a cathode, in which the anode is connected to one end of the secondary winding of said transformer and the positive direct current voltage is outputted from the cathode, a first smoothing capacitor connected between the cathode of said first rectifier diode and the ground, a second rectifier diode comprising an anode and a cathode, in which the cathode is connected to the other end of said transformer and the negative d-c voltage is outputted from the anode, and a second smoothing capacitor connected between the anode of said second rectifier diode and the ground.

4. The direct current power unit according to claim 1, wherein said first voltage regulator means comprises a first resistance having one end connected in series to the output side of the positive direct current voltage of said rectifier means, and a first zener diode connected between the other end of said first resistance and the ground, and said second voltage regulator means comprises a second resistance having one end connected in series to the output side of the negative direct current voltage of said rectifier means, and a second zener diode connected between the other end of said second resistance and the ground.

5. The direct current power unit according to claim 1, wherein said first resistance type potential divider means comprises first variable resistance means and a first resistance connected between said first variable resistance means and the output of said second voltage regulator means, and said second resistance type potential divider means comprises second variable resistance means and a second resistance connected between said second variable resistance means and the output of said first voltage regulator means.

6. The direct current power unit according to claim 1, which further comprises a first backflow preventing diode connected between an output of said first variable resistance means and said output terminal, and a second backflow preventing diode connected between an output of said second variable resistance means and said output terminal.

7. The direct current power unit according to claim 1, wherein said first switching means and said second switching means comprise means for closing one of said first switching means and said second switching means when the other thereof is opened.

* * * * *